Patented Aug. 7, 1928.

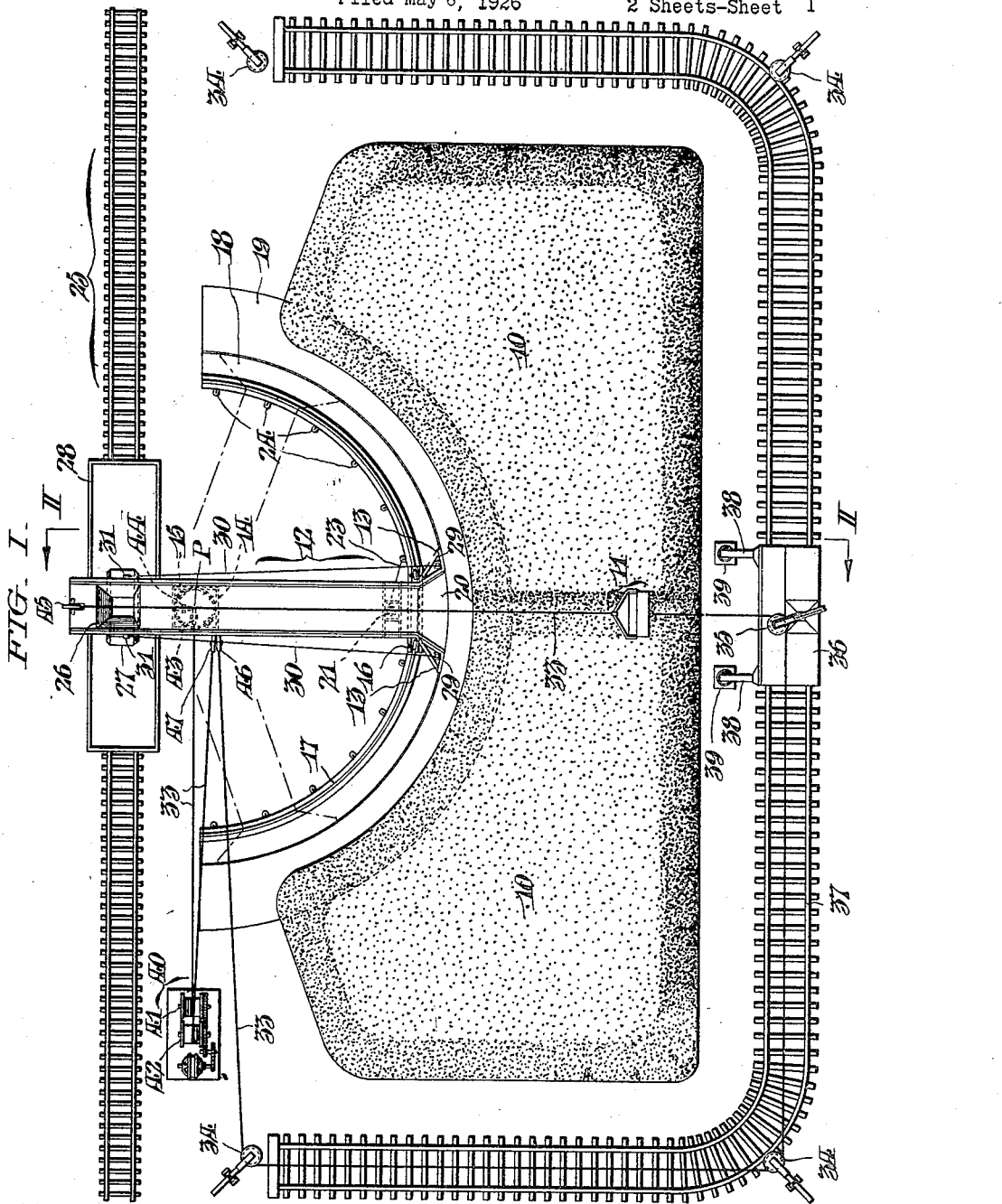

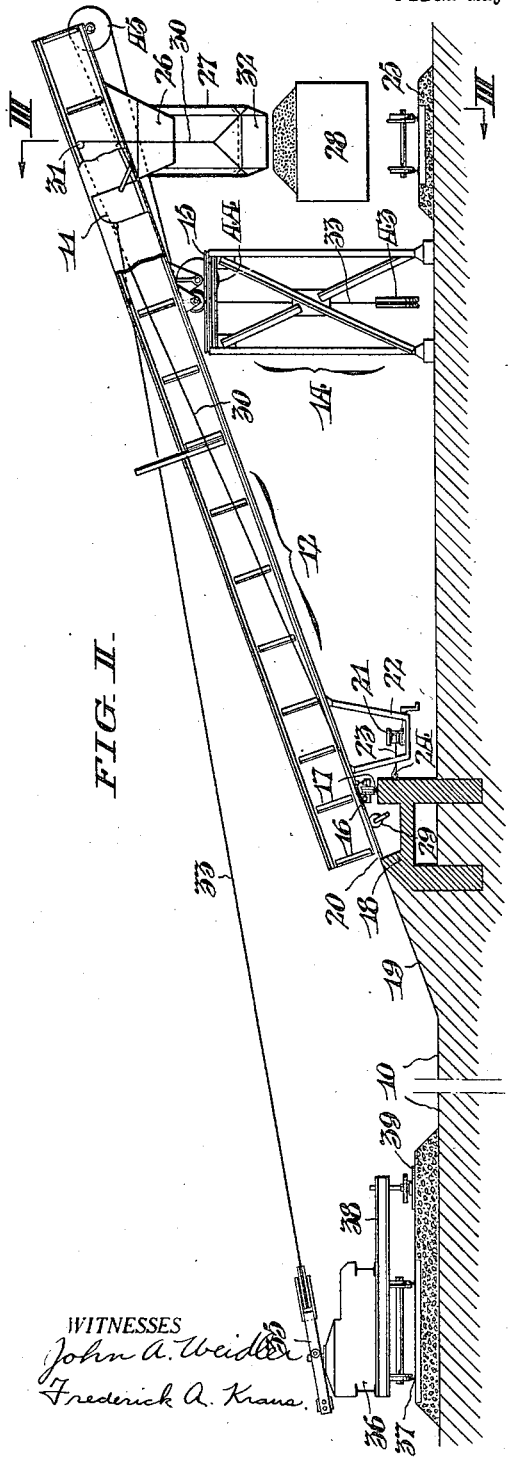

1,680,242

UNITED STATES PATENT OFFICE.

ROBERT H. BEAUMONT, OF RADNOR, PENNSYLVANIA, ASSIGNOR TO R. H. BEAUMONT CO., OF PHILADELPHIA, PENNSYLVANIA, A CORPORATION OF PENNSYLVANIA.

MATERIAL STORAGE AND HANDLING SYSTEM.

Application filed May 6, 1926. Serial No. 107,099.

This invention relates to systems for storing and handling materials such as coal, gravel or sand,—more particularly to systems of the kind characterized by an extensive out-door storage field over which the material is initially distributed and subsequently reclaimed with the aid of a cable drag scraper capable of adjustable radial guidance relative to a fixed focal point, for operation over the entire storage area.

In connection with systems of the type referred to, it is customary to employ a stationary mounting incline or ramp at the region of reclamation for the purpose of elevating the cable drag scraper above the ground level of the storage area to enable gravity dumping of the conveyed charges of the material into cars or other receptacles. Such ramps are usually constructed from concrete, and by virtue of their extent over a considerable area—especially in large storage plants—are, obviously, exceedingly costly to construct and maintain.

The present invention is in part directed toward securing all the advantages of an organization of the aforementioned type at considerably less expense, and this end I attain by provision of a ramp of a width just sufficient to take the cable drag scraper, and with capacity for being positionally shifted into alignment with any selected path of travel determined for the drag scraper over the storage area.

My invention is also concerned with obviating excessive wear on the cable of the scraper, more particularly with regard to the return run thereof, which, in guide systems heretofore employed, was permitted to drag over the top of the material enroute to and from the winding mechanism.

This invention also comprehends other novel features collectively contributing to economic construction and operation of material storage and handling systems involving use of cable drag scrapers, and these improvements will be readily apparent from the detailed description which follows.

In the drawings, Fig. I is a plan view, more or less diagrammatically represented, of a material storage and handling system conveniently embodying my invention.

Fig. II is a transverse sectional view of the organization taken as indicated by the arrows II—II in Fig. I; and Fig. III is an elevation of the outer end of the ramp viewed as indicated by the arrows III—III in Fig. II.

The storage area—comprehensively designated by the numeral 10—is substantially oblong in plan, while distribution of the material initially as well as its subsequent reclamation is effected by radial travel of a cable drag scraper 11 over different portions of the storage area 10 relative to a fixed focal point P, in the present instance located midway of the upper edge of the field. Fulcrumed with capacity to be swung about the focal point P, is an elevating ramp 12 of channel cross section having a width just sufficient to take the drag scraper 11, and its outfield end is flared, as at 13, to facilitate entry of said scraper. The fulcrum mounting for this ramp 12 may take any approved form, for example a tower or pedestal such as shown at 14 in Fig. I, to support a roller turn table 15, see Fig. II also. At the infield end, the ramp 12 is supported by a wheeled truck 16 arranged to run on an arcuate rail 17. This rail 17 is mounted on the top of a buttress wall 18, which, as shown, is curved concentrically relative to the focal point P. The approach of the wall 18 is sloped as at 19, to conform to the inclination of the ramp 12, and a lip 20 on the contiguous end of the latter assures an uninterrupted flush surface for traverse of the scraper 11. Any convenient means may be used to shift the ramp 12 about its fulcrum 14, for example a manually operable windlass 21 herein shown as supported in a suspension cradle 22 on said ramp, see Fig. II, and a cable 23 with a hook on its free end capable of being engaged with any one of a number of anchorage loops 24 distributed at suitably spaced intervals along the buttress wall 18. The outer end of the ramp 12 projects beyond the tower 14 and overhangs a railway track 25 extending along the upper side of the storage area 10, and embodies a hopper 26 designed to receive the charges of material conveyed to it by the drag scraper 11. Suspended crosswise of the overhang end of the ramp 12 beneath the hopper 26, is a chute 27 which is centrally pivoted so as to be swingable to either the full line, or the dot-and-dash line, position shown in Fig. III. By this arrangement it will be apparent that the discharge from the hopper 26 may be directed into opposite ends of a car 28 on the track 25, as desired or required. As a means to swing the chute 27 for the purposes specified, I preferably employ windlasses 29, 29, which, for convenience are located at the infield end of the ramp 12 near the shifting windlass 21 aforementioned, and take the ends of cables 30, 30. These cables 30, 30 are guided over directional pulleys 31, 31, and their free ends are attached to pivoted extensions or gates 32, 32 at opposite extremities of the chute 27—all as shown in Figs. I and II. The construction of the discharge chute 27 and the method of its mounting and pivoting may obviously be varied to suit special conditions of actual practice, the form illustrated being typical of a number of other possible embodiments enabling the discharge to be diverted in different directions.

The novel system which I provide for guidance of the tow cable 33 of the drag scraper 11 with capacity for adjustment to operate over any desired portion of the storage area 10, includes a number of fixed tail blocks or sheaves 34 shown as located at the four corners of the field, and a "roving" tail block or sheave 35 adapted to be shifted relative to the fixed sheaves 34 aforesaid as well as with respect to the focal point P. The roving tail block or sheave 35 is mounted on a car 36 capable of being moved from one position to another along a railway track 37 that skirts the lower side and the opposite ends of the storage area 10, see Fig. I. The car 36 has laterally-extending out-rigger arms 38 equipped at their outer ends with screw-jack pads 39 which can be forced into contact with the track bed as shown in Fig. II, thereby to function as anchorages to hold the car 36 against movement in shifted positions.

The actuating mechanism for the drag scraper 11 is diagrammatically depicted at 40 in Fig. I and, as shown, is of the type embodying separate drums 41, 42 to take opposite ends of the tow cable 33, the leading end or run of the cable 33 is first guided to grooved lower and upper directional pulleys 43, 44 on the tower 14, and thence rearward from the latter of said pulleys to a third pulley 45 journaled centrally of the overhang end of the ramp 12, being thereby brought over the top of the latter for connection to the drag scraper 11. The return run of the tow cable 33, after passing about the roving sheave 35 and the fixed tail blocks 34, is guided into line with the drum 42 of the winding mechanism 40 by directional pulleys 46, 47 also supported by the tower 14.

From the foregoing, it will be seen that by shifting the tail block car 36 along the track 37, radial traverse of the drag scraper 11 relative to the focal point P may be predetermined over any portion of the storage area 10, and the ramp 12 correspondingly moved into alignment with the course selected for the scraper 11, the limits of movement of said ramp being indicated in dot-and-dash lines in Fig. I. By proper choice as between the several fixed tail blocks 34, it will also be seen that the return run of the cable 33 may be caused to take a course perimetrically about the field so as to run clear of contact with the material for protection against excessive wear.

Having thus described my invention, I claim:

1. In a material storage and handling system of the character described, a drag scraper for reclaiming the material from the storage area, a cable with guide means adjustable to determine linear travel of the scraper over different portions of the storage area, and a permanently pivoted elevating ramp with its lower end traversing a concentric track for alignment into the path of travel of the scraper.

2. In a material storage and handling system of the character described, a drag scraper for reclaiming the material from the storage area, a cable with guide means adjustable to determine travel of the scraper along radial lines over different portions of the storage area and relative to a stationary focal point, and an elevating ramp permanently pivoted co-axial of said focal point with its lower end sustained by an arcuate track so as to be turnable into any selected radial path of the scraper.

3. In a material storage and handling system of the character described, a drag scraper for reclaiming the material from the storage area, a cable with guide means adjustable to determine travel of the scraper along radial lines over different portions of the storage area and relative to a fixed focal point, an elevating ramp pivoted at said focal point, the inner end of the ramp being supported by a wheeled truck running on an arcuate track concentric with the focal point, and means for moving the ramp into alignment with any selected path of travel of the scraper.

4. In a material storage and handling system of the character described, a drag scraper for reclaiming the material from the storage area, a cable with guide means adjustable to determine travel of the scraper along radial lines over different portions of the storage area and relative to a fixed focal point, an elevating ramp pivoted at said focal point so as to be alignable with different selected radial paths determined for the scraper, and a concentric arcuate sloping buttress wall defining the inner edge of the storage area and forming in conjunction with the ramp, a continuous flush incline for the scraper.

5. In a material storage and handling system of the character described, a drag scraper for reclaiming the material from the storage area, a cable with guide means adjustable to determine travel of the scraper along radial lines over different portions of the storage area and relative to a stationary focal point, an elevating ramp permanently pivoted about said focal point so as to be alignable with different selected radial paths determined for the scraper, the inner end of the ramp being traversable over an arcuate track and the outer end thereof terminating in an overhanging receiving hopper beyond the focal point, and a chute adjustable relative to the hopper to enable discharge of the material in different directions.

6. In a material storage and handling system of the character described, a drag scraper for reclaiming the material from the storage area, a cable with guide means adjustable to determine travel of the scraper along radial lines over different portions of the storage area and relative to a stationary focal point, an elevating ramp pivoted about said focal point so as to be alignable with different selected radial paths determined for the scraper, the lower end of the ramp being traversable over an arcuate track and the upper end thereof terminating in an overhanging receiving hopper beyond the focal point, and a discharge chute pivoted centrally beneath the hopper so as to be swingable to direct the discharge laterally to one or the other side of the ramp.

7. In a material storage and handling system of the character described, a cable drag scraper to initially distribute the material over the storage area and to subsequently reclaim it, and a permanently pivoted ramp movable about a stationary axis with its lower end co-operative with an arcuate track, and means to determine linear travel of the active run of the drag scraper cable longitudinally of the ramp over different portions of the storage area, and travel of the return run of the cable around the margin of the material in said storage area.

In testimony whereof, I have hereunto signed my name at Philadelphia, Pennsylvania, this 3rd day of May, 1926.

ROBERT H. BEAUMONT.